(12) United States Patent
Muramatsu et al.

(10) Patent No.: US 8,321,368 B2
(45) Date of Patent: Nov. 27, 2012

(54) IDENTIFICATION DEVICE, IDENTIFICATION METHOD, AND IDENTIFICATION PROCESSING PROGRAM

(75) Inventors: Shogo Muramatsu, Niigata (JP); Hidenori Watanabe, Niigata (JP)

(73) Assignee: Niigata University (JP)

( * ) Notice: Subject to any disclaimer, the term of this patent is extended or adjusted under 35 U.S.C. 154(b) by 376 days.

(21) Appl. No.: 12/811,006

(22) PCT Filed: Jan. 16, 2009

(86) PCT No.: PCT/JP2009/050529
§ 371 (c)(1),
(2), (4) Date: Jun. 28, 2010

(87) PCT Pub. No.: WO2009/093525
PCT Pub. Date: Jul. 30, 2009

(65) Prior Publication Data
US 2010/0287133 A1 Nov. 11, 2010

(30) Foreign Application Priority Data
Jan. 23, 2008 (JP) .................................. 2008-012678

(51) Int. Cl.
*G06F 17/00* (2006.01)
(52) U.S. Cl. .............................. 706/52; 706/12; 382/224
(58) Field of Classification Search .................... 706/52; 382/224
See application file for complete search history.

(56) References Cited

U.S. PATENT DOCUMENTS

| | | | |
|---|---|---|---|
| 6,785,645 B2* | 8/2004 | Khalil et al. ................. | 704/216 |
| 7,080,011 B2* | 7/2006 | Baumgartner et al. ....... | 704/231 |
| 7,756,341 B2* | 7/2010 | Perronnin ..................... | 382/224 |
| 7,933,454 B2* | 4/2011 | Bressan et al. ............... | 382/224 |
| 8,107,541 B2* | 1/2012 | Divakaran et al. ........ | 375/240.28 |
| 2005/0276446 A1* | 12/2005 | Chen et al. .................... | 382/103 |

FOREIGN PATENT DOCUMENTS

| | | |
|---|---|---|
| JP | 2003-187229 A | 7/2003 |
| JP | 2005-267570 A | 9/2005 |

OTHER PUBLICATIONS

Minghua Shi; Bermak, A.; Chandrasekaran, S.; Amira, A.; , "An Efficient FPGA Implementation of Gaussian Mixture Models-Based Classifier Using Distributed Arithmetic," Electronics, Circuits and Systems, 2006. ICECS '06. 13th IEEE International Conference on , vol., No., pp. 1276-1279, Dec. 10-13, 2006.*

Muramatsu et al., "Efficient Classification for Gaussian Mixture Models with Interval Calculation", IEICE Technical Report, vol. 107, No. 475, Shadan Hojin The Institute of Electronics, Information and Communication Engineers, Jan. 24, 2008, pp. 55-60.

\* cited by examiner

*Primary Examiner* — Alan Chen
*Assistant Examiner* — David H Kim
(74) *Attorney, Agent, or Firm* — Akerman Senterfitt

(57) ABSTRACT

There are provided an identification device, an identification method and an identification processing program, which are capable of significantly reducing a processing burden. An identification device 1 can judge the magnitude relation between an occurrence probability value of a class 0 and an occurrence probability value of a class 1 from the magnitude relation between $g_k^{upper}$ and $g_k^{lower}$. Hence, it can be identified which one of the classes 0 and 1 is applicable to observed data D1 with a simple arithmetic processing. Accordingly, a complicated and heavy-burden arithmetic processing of an exponential function can be avoided for obtaining the occurrence probability values of the classes 0 and 1, enabling the processing burden to be significantly reduced.

9 Claims, 6 Drawing Sheets

FIG.2

$$g_k(\mathbf{x}) = \underbrace{p[c_k]\sum_{n=0}^{N_k-1}\alpha_{k,n}\underbrace{\frac{1}{(2\pi)^{\frac{D}{2}}|\Sigma_{k,n}|^{\frac{1}{2}}}}_{K_{k,n}}}_{ER2}\exp\underbrace{\left\{-\frac{1}{2}(\mathbf{x}-\mu_{k,n})^T\Sigma_{k,n}^{-1}(\mathbf{x}-\mu_{k,n})\right\}}_{\substack{ER1 \\ z_{k,n}(\mathbf{x})}}$$

IDENTIFICATION DEVICE, IDENTIFICATION METHOD, AND IDENTIFICATION PROCESSING PROGRAM

TECHNICAL FIELD

The present invention relates to an identification device, an identification method and an identification processing program, which are suitably applicable to, e.g., an identification device for identifying a given target based on the Bayes' decision rule of Gaussian mixture distributions.

BACKGROUND ART

In recent years, as a technique for a sensor to sense an identification target to identify what the identification target is like based on observed data obtained from the sensor, there is known such a technique that a certain probability distribution model is assumed to identify the identification target according to the Bayes' decision rule (refer to, e.g., patent document 1).

Under the assumption that the observed data each follow a single Gaussian distribution, the exponential functions multiplied by a certain constant K: $K \exp(-z)$, are compared to one another to thereby enable pattern recognition. This pattern recognition can be realized by the comparison between the numbers of $(\ln K - z)$ produced by applying a logarithm to the function and hence there is no need to calculate an exponential function in an identification device. It is to be noted herein that $\ln K$ is a constant.

Here, a single Gaussian distribution is unsuitable to data that follow a multi-modal distribution and therefore has disadvantages of limited applications. This problem with the multi-modal distribution, however, can be improved by introducing Gaussian mixture distributions expressed by the following formula which means a weighted sum of Gaussian distributions.

$$\sum_n K_n \exp(-z_n) \qquad \text{[Formula 1]}$$

The patent document 1: Japanese unexamined patent application publication No. 2005-267570

DISCLOSURE OF THE INVENTION

Problems to be Solved by the Invention

The comparison between Gaussian mixture distributions, however, cannot eliminate the need to use an exponential function, even if a logarithm is applied thereto, thus resulting in an increase in amount of calculation. Hereunder, a specific explanation is given in regard to this point.

First, the Bayes' decision rule employed here means a method for identifying a class to which observed data (feature vectors) belong after classes are given in advance. According to the Bayes' theorem employed for the Bayes' decision rule, the occurrence probability of an event B, for example, is expressed as P(B) and the occurrence probability of an event B after an event A has occurred is expressed as P(B|A) and if P(A)>0, the following formula holds true.

$$P(B|A) = \frac{P(A|B)P(B)}{P(A)} \qquad \text{[Formula 2]}$$

According to the Bayes' decision rule, when observed data are given, conditional probabilities of $P[C=c_0|x]$ and $P[C=c_1|x]$ in classes $c_0$, $c_1$, for example, are compared with each other to select a class of providing higher probability as a class to which the observed data belong. This selection minimizes an error rate. The conditional probability P[C|x] can be expressed by the following formula from the above Bayes' theorem.

$$P[C|x] = \frac{p(x|C)P[C]}{p(x)} \propto p(x|C)P[C] \qquad \text{[Formula 3]}$$

Thus, the Bayes' decision rule carries out evaluation by using p(x|c) and P[c] according to the following discriminant of formula 4:

$$g(x) = p(x|c_1)P[c_1] - p(x|c_0)P[c_0] \qquad \text{[Formula 4]}$$

In other words, a target can be determined as in $c_1$ if $g(x)>0$ and as in $c_0$ if $g(x)<0$.

Here, in order to utilize the above descriminant shown in the formula 4, a conditional probability density function p(x|C) is needed in advance. For example, when p(x|C) is modeled as multidimensional (e.g., D-dimensional) Gaussian mixture distributions (multivariate Gaussian mixture distributions), D-dimensional Gaussian distributions are expressed as formula 5:

$$N\left(x \mid \mu, \sum\right) = \frac{1}{(2\pi)^{\frac{D}{2}} |\Sigma|^{\frac{1}{2}}} \exp\left\{-\frac{1}{2}(x-\mu)^T \sum\nolimits^{-1}(x-\mu)\right\} \qquad \text{[Formula 5]}$$

where D denotes the number of variates, x denotes observed data (feature vectors), μ denotes a D×1 mean vector, and Σ denotes a D×D covariance matrix (covariance means a factor indicating to what extent two data are relevant and interlocked with respect to each other).

A probability density function M(x|Θ) of the D-dimensional Gaussian mixture distributions can be expressed, using the above formula 5, as follows:

$$M(x|\Theta) = \sum_{n=0}^{N-1} \alpha_n N\left(x \mid \mu_n, \sum\nolimits_n\right) \qquad \text{[Formula 6]}$$

where Θ denotes a set of parameters: $\Theta = \{\{\alpha_n\}, \{\mu_n\}, \{\Sigma_n\}\}$, N denotes the number of Gaussian mixture distributions, and $\alpha_n$ denotes a mixture ratio. By modeling such Gaussian mixture distributions as shown in the formula 6 by an appropriate mixture number, distribution of a complicated shape can be approximated with an arbitrary accuracy.

Then, on the assumption that the conditional probability density p(x|C) of a probability variable vector x follows the multivariate Gaussian mixture distributions shown in the above formula 6, the above discriminant shown in the formula 4 is expressed by the following formulae:

$$g(x) = g_1(x) - g_0(x) \quad \text{[Formula 7]}$$

$$g_k(x) = P[c_k] \sum_{n=0}^{N_k-1} \alpha_{k,n} \frac{1}{(2\pi)^{\frac{D}{2}} |\sum_{k,n}|^{\frac{1}{2}}} \quad \text{[Formula 8]}$$

$$\exp\left\{-\frac{1}{2}(x-\mu_{k,n})^T \sum_{k,n}^{-1} (x-\mu_{k,n})\right\} =$$

$$\sum_{n=0}^{N_k-1} K_{k,n} \exp(-z_{k,n}(x)) \left( K_{k,n} = \frac{P[C_k]\alpha_{k,n}}{(2\pi)^{\frac{D}{2}} |\sum|^{\frac{D}{2}}} , \right.$$

$$\left. z_{k,n} = \frac{1}{2}(x-\mu_{k,n})^T \sum_{k,n}^{-1} (x-\mu_{k,n}) \right)$$

where $\{\alpha_{k,n}\}$ denotes a set of parameters given to a class $c_k$ and k denotes 0 or 1 which indicates a class. Here, in the formula 8 mentioned-above, sites of variables are calculated as a group $(z_{k,n}(x))$ of variables based on each probability variable vector x of a plurality of observed data, while sites of constants are calculated as a group $K_{k,n}$ of constants based on parameters of Gaussian mixture distributions (k denotes 1 or 0 indicating a class and n denotes a distribution number of a Gaussian distribution assumed in each class).

Accordingly, when the determination of which of the class $c_1$ and the class $c_0$ is applicable is made based on $g(x)>0$ or $g(x)<0$ as described above, complicated and heavily-burdened arithmetic processing of an exponential function as shown in the formula 8 has heretofore been required.

Such an increase in amount of the arithmetic processing poses an impediment to applying the same to systems that require high-speed performance and low electric power consumption. Hence, it has been desired to reduce the burden on the arithmetic processing in such an identification device.

And now, as an arithmetic processing effective for an exponential function, a CORDIC algorithm is known, which is employed in a scientific electronic calculator as well. Even if the CORDIC algorithm is utilized, however, a useless arithmetic processing occurs and hence there arises the problem of hindering fast identification.

In view of the problems described above, it is an object of the present invention to provide an identification device, an identification method and an identification processing program which are capable of significantly reducing a processing burden.

Means for Solving the Problems

In order to solve such problems, there is provided, according to a first aspect of the present invention, an identification device for classifying observed data based on parameters of Gaussian mixture distributions on the assumption that a distribution of the observed data follows Gaussian mixture distributions, the identification device including:

a power of two multiplier for calculating the following formulae:

$$h_{k,n}^{upper} = K_{k,n} 2^{-[z_{k,n} \log_2 e]} \quad \text{[Formula 9]}$$

(where $[z_{k,n} \log_2 e]$ denotes an integer part of $z_{k,n} \log_2 e$)

$$h_{k,n}^{lower} = h_{k,n}^{upper} 2^{-1} \quad \text{[Formula 10]}$$

using a group $z_{k,n}$ of variables obtained based on respective feature vectors of a plurality of said observed data (k denotes 1 or 0 indicating a class, and n denotes a distribution number of a Gaussian distribution assumed in each class) and a group $K_{k,n}$ of constants obtained based on said parameter of Gaussian mixture distributions;

an accumulator for calculating the following formulae:

$$g_k^{upper} = \sum_{n=1}^{N_k} h_{k,n}^{upper} \quad \text{[Formula 11]}$$

$$g_k^{lower} = \sum_{n=1}^{N_k} h_{k,n}^{lower} \quad \text{[Formula 12]}$$

($N_k$ denotes the number of Gaussian mixture distributions of a class k) using said $h_{k,n}^{upper}$ and said $h_{k,n}^{lower}$; and a comparator for comparing said $g_k^{upper}$ and said $g_k^{lower}$ to classify said observed data, using $g_1^{upper} \leq g_0^{lower}$ and $g_0^{upper} \leq g_1^{lower}$.

A second aspect of the present invention is the identification device in which the identification device is equipped with a storage unit having the following formulae stored therein, $$B[i] = 2^{-2^{-i}} \quad \text{[Formula 13]}$$

$$B[i]^{-1} = 2^{2^{-i}} \quad \text{[Formula 14]}$$

(where i=0, 1 ..., L, wherein L is a positive integer that is arbitrarily set) and when said $g_k^{upper}$ and said $g_k^{lower}$ are compared to each other to prove impossible to determine the magnitude relation between said $g_k^{upper}$ and said $g_k^{lower}$ said value of i is changed into a value of (i+1) and then it is judged whether a value at the ith decimal place in a fraction part of $z_{k,n} \log_2 e$ is 1 or 0, and when the value at the ith decimal place is proved to be 1 as a result, said $h_{k,n}^{upper}$ is multiplied by said B[1] in said formula 13 and thus said $h_{k,n}^{upper}$ is updated to thereby calculate said $g_k^{upper}$, whereas when the value at the ith decimal place is proved to be 0, said $h_{k,n}^{lower}$ is multiplied by $B[1]^{-1}$ in said formula 14 and thus said $h_{k,n}^{lower}$ is updated to thereby calculate said $g_k^{lower}$.

A third aspect of the present invention is the identification device which is equipped with an averaging processor for calculating the following formula:

$$g_k^{pseudo} = 2^{-1} \{g_k^{lower} B[L]^{-1} + g_k^{upper}\} \quad \text{[Formula 15]}$$

when the value of i is the L and then classifying the observed data by $g_1^{pseudo} < g_0^{pseudo}$ and $g_0^{pseudo} < g_1^{pseudo}$.

A fourth aspect of the present invention is an identification method for classifying observed data based on parameters of Gaussian mixture distributions on the assumption that a distribution of the observed data follows Gaussian mixture distributions, the identification method including steps of:

performing power of two multiplication for calculating the following formulae:

$$h_{k,n}^{upper} = K_{k,n} 2^{-[z_{k,n} \log_2 e]} \quad \text{[Formula 16]}$$

(where $[z_{k,n} \log_2 e]$ denotes an integer part of $z_{k,n} \log_2 e$)

$$h_{k,n}^{lower} = h_{k,n}^{upper} 2^{-1} \quad \text{[Formula 17]}$$

using a group $z_{k,n}$ of variables obtained based on respective feature vectors of a plurality of said observed data (k denotes 1 or 0 indicating a class, and n denotes a distribution number of a Gaussian distribution assumed in each class) and a group $K_{k,n}$ of constants obtained based on said parameter of Gaussian mixture distributions;

performing accumulation for calculating the following formulae:

$$g_k^{upper} = \sum_{n=1}^{N_k} h_{k,n}^{upper} \qquad \text{[Formula 18]}$$

$$g_k^{lower} = \sum_{n=1}^{N_k} h_{k,n}^{lower} \qquad \text{[Formula 19]}$$

(where $N_k$ denotes the number of Gaussian mixture distributions of a class k) using said $h_{k,n}^{upper}$ and said $h_{k,n}^{lower}$, which have been calculated in said step of performing power of two multiplication; and comparing said $g_k^{upper}$ and said $g_k^{lower}$, which have been calculated in said step of performing accumulation to classify said observed data, using $g_1^{upper} \leq g_0^{lower}$ and $g_0^{upper} \leq g_1^{lower}$.

A fifth aspect of the present invention is an identification method comprising a step of a refining process in which when said $g_k^{upper}$ and said $g_k^{lower}$ are compared to each other to prove impossible to determine the magnitude relation between them, a value of i is updated to be changed into a value of (i+1) and then it is judged whether a value at the ith decimal place in a fraction part of $z_{k,n} \log_2 e$ is 1 or 0 and as a result, when the value at the ith decimal place of $z_{k,n} \log_2 e$ is proved to be 1, said $h_{k,n}^{upper}$ is multiplied by the following formula:

$$B[i] = 2^{-2^{-i}} \qquad \text{[Formula 20]}$$

(where i=0, 1 ..., L, and L is a positive integer that is arbitrarily set) and thus said $h_{k,n}^{upper}$ is updated to thereby calculate said $g_k^{upper}$, whereas when the value at the ith decimal place of $z_{k,n} \log_2 e$ is proved to be 0, said $h_{k,n}^{lower}$ is multiplied by the following formula:

$$B[i]^{-1} = 2^{2^{-i}} \qquad \text{[Formula 21]}$$

and thus said $h_{k,n}^{lower}$ is updated to thus calculate said $g_k^{lower}$.

A sixth aspect of the present invention is an identification method including a step of an averaging process in which when a value of said i is said L, the following formula:

$$g_k^{pseudo} = 2^{-1} \{g_k^{lower} B[L]^{-1} + g_k^{upper}\} \qquad \text{[Formula 22]}$$

is calculated to classify said observed data by using $g_1^{pseudo} \leq g_0^{pseudo}$ and $g_0^{pseudo} \leq g_1^{pseudo}$.

A seventh aspect of the present invention is an identification processing program for classifying observed data based on parameters of Gaussian mixture distributions on the assumption that a distribution of the observed data follows Gaussian mixture distributions, the identification processing program allowing a computer to execute the steps of:

performing power of two multiplication for calculating the following formulae:

$$h_{k,n}^{upper} = K_{k,n} 2^{-[z_{k,n} \log_2 e]} \qquad \text{[Formula 23]}$$

(where $[z_{k,n} \log_2 e]$ denotes an integer part of $z_{k,n} \log_2 e$)

$$h_{k,n}^{lower} = h_{k,n}^{upper} 2^{-1} \qquad \text{[Formula 24]}$$

by using a group $z_{k,n}$ of variables obtained based on respective feature vectors of a plurality of said observed data (k denotes 1 or 0 indicating a class, and n denotes a distribution number of a Gaussian distribution assumed in each class) and a group $K_{k,n}$ of constants obtained based on said parameter of Gaussian mixture distributions;

performing accumulation for calculating the following formulae:

$$g_k^{upper} = \sum_{n=1}^{N_k} h_{k,n}^{upper} \qquad \text{[Formula 25]}$$

$$g_k^{lower} = \sum_{n=1}^{N_k} h_{k,n}^{lower} \qquad \text{[Formula 26]}$$

($N_k$ denotes the number of Gaussian mixture distributions of a class k)

by using said $h_{k,n}^{upper}$ and said $h_{k,n}^{lower}$, which have been calculated in said step of performing power of two multiplication; and comparing said $g_k^{upper}$ and said $g_k^{lower}$ to classify said observed data by using $g_1^{upper} \leq g_0^{lower}$ and $g_0^{upper} \leq g_1^{lower}$.

A eighth aspect of the present invention is an identification processing program which includes a step of a refining process in which when said $g_k^{upper}$ and said $g_k^{lower}$ are compared to each other to prove impossible to determine the magnitude relation between them, said value of is changed into a value of (i+1) and then it is judged whether a value at the ith decimal place in a fraction part of $z_{k,n} \log_2 e$ is 1 or 0, and as a result, when the value at the ith decimal place of $z_{k,n} \log_2 e$ is proved to be 1, said $h_{k,n}^{upper}$ is multiplied by the following formula:

$$B[i] = 2^{-2^{-i}} \qquad \text{[Formula 27]}$$

(i=0, 1 ..., L, and L is a positive integer arbitrarily set) and thus said $h_{k,n}^{upper}$ is updated to thus calculate said $g_k^{upper}$, whereas when the value at the ith decimal place of $z_{k,n} \log_2 e$ is proved to be 0, said $h_{k,n}^{lower}$ is multiplied by the following formula:

$$B[i]^{-1} = 2^{2^{-i}} \qquad \text{[Formula 28]}$$

and thus said $h_{k,n}^{lower}$ is updated to thus calculate said $g_k^{lower}$.

A ninth aspect of the present invention is an identification processing program including a step of an averaging process in which when a value of said i is said L, the following formula:

$$g_k^{pseudo} = 2^{-1} \{g_k^{lower} B[L]^{-1} + g_k^{upper}\} \qquad \text{[Formula 29]}$$

is calculated to classify said observed data by using $g_1^{pseudo} \leq g_0^{pseudo}$ and $g_0^{pseudo} \leq g_1^{pseudo}$.

Effects of the Present Invention

According to the identification device of the first aspect, the identification method of the third aspect and the identification processing program of the seventh aspect, the observed data can be identified from the magnitude relation between the $g_k^{upper}$ and the $g_k^{lower}$ which have been obtained by a simple interval calculation. Hence, a complicated arithmetic processing of an exponential function for calculating the occurrence probability value of a class can be avoided, thus permitting a processing burden to be significantly reduced.

Further, according to the identification device of the second aspect, the identification method of the fourth aspect and the identification processing program of the eighth aspect, the precision of the comparison of the arithmetic processing can be increased in a stepwise fashion. Hence, an unclear interval can be narrowed to enable the observed data to be classified by comparatively simple interval arithmetic processing, thus permitting a complicated arithmetic processing of an exponential function for calculating the occurrence probability value of a class to be avoided.

Furthermore, according to the identification device of the third aspect, the identification method of the sixth aspect and the identification processing program of the ninth aspect, even if the magnitude relation between the $g_k^{upper}$ and the $g_k^{lower}$ is unclear, the observed data can be finally classified with certainty.

BRIEF DESCRIPTION OF THE DRAWINGS

FIG. 2 is a schematic diagram illustrating a group $(z_{k,n})$ of variables and a group $(K_{k,n})$ of constants.

BEST MODE FOR CARRYING OUT THE INVENTION

Hereunder is a detailed description of an embodiment of the present invention based on accompanying drawings.

(1) Overall Structure of an Identification Device

Figure 1:
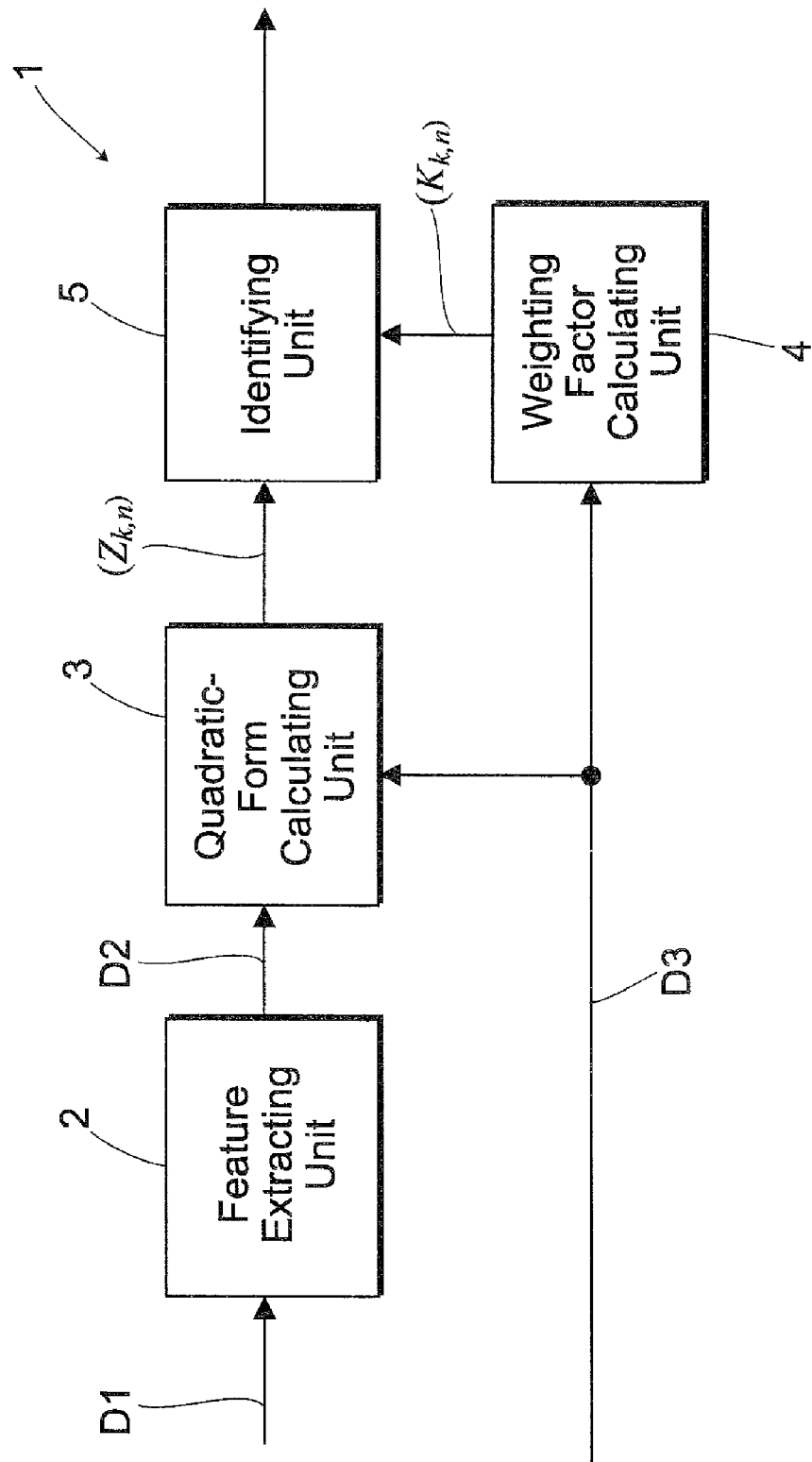
FIG. 1 is a block diagram illustrating a circuitry of an identification device according to the present invention.

In FIG. 1, numeral symbol 1 denotes an identification device according to the present invention. On the assumption that a distribution of observed data D1 follows Gaussian mixture distributions, based on parameters of Gaussian mixture distributions, the identification device 1 can identify that the observed data D1 belong to either a class 1 or a class 0.

In addition, here, as an identified result, the class 1 or the class 0 are defined. These classes, however, only indicate an affirmative result of the presence of an object to be identified and a negative result of the absence of the object to be identified.

Specifically explaining, when being allowed to identify whether an object is present or absent in an image taken by, e.g., a TV camera, in other words, whether each pixel belongs to either a background image (defined as a class 0) or a person (defined as a class 1), the identification device 1 inputs image data obtained from the TV camera to a feature extracting unit 2 as observed data D1.

The feature extracting unit 2 applies a given image processing to D1 to calculate a feature vector D2 comprising a position of each pixel within an image plane and coordinate axes (x, y) indicating, e.g., a position of each pixel within an image plane and a wide variety of pixel information such as a luminance value and a color of the pixel and then sends out the feature vector D2 to a quadratic-form calculating unit 3.

As an application example to a flesh color identification, in order that the identification device 1 identifies a human from among background images, the identification device 1 classifies each pixel into a flesh color (the class 1) and a nonflesh color (the class 0). In this case, the feature vector D2 comprises coordinate data indicating a position of the pixel and data indicating each value of R (red), G (green) and B (blue) in the pixel indicated by the coordinate data.

At this time, the identification device 1 assumes that the distribution of the observed data D1 follows Gaussian mixture distributions and then sends out a group D3 of parameters of D-dimensional Gaussian mixture distributions comprising a plurality of components obtained from a distribution of a pixel set to the quadratic-form calculating unit 3 and a weighting factor calculating unit 4.

Based on the feature vector D2 and the group D3 of the parameters of Gaussian mixture distributions, the quadratic-form calculating unit 3 extracts only variables and then calculates a group $(z_{k,n})$ of variables to send out the calculated group $(z_{k,n})$ of variables to an identifying unit 5. At the same time, based on the group D3 of the parameters of Gaussian mixture distributions, the weighting factor calculating unit 4 extracts only constants and then calculates the group $(K_{k,n})$ of constants to send out the calculated group $(K_{k,n})$ of constants to the identifying unit 5.

Specifically, as the group $(z_{k,n})$ of variables and the group $(K_{k,n})$ of constants, as shown in FIG. 2, sites ER1 of variables in the conventional formula 8 described above are calculated as the group $(z_{k,n})$ of variables, while sites ER2 of constants are calculated as the group $(K_{k,n})$ of variables. In addition, the group $(z_{k,n}(x))$ of variables is shown in FIG. 2 in the formula 8. It is clear, however, that the group $(z_{k,n})$ of variables is a function of x and therefore for convenience sake of explanation, hereunder, the group $(z_{k,n}(x))$ of variables is simply shown as the group $(z_{k,n})$ of variables.

Here, without actually calculating the exponential function of the following formula 30 indicating the probability leading to the class 0 (hereunder, is referred to as an occurrence probability of the class 0), the identifying unit 5 carries out a given identifying process to calculate a lower limit value (hereunder, is referred to as an occurrence lower limit value of the class 0) which is smaller than the occurrence probability value of the class 0 and requires no calculation of an exponential function and an upper limit value (hereunder, is referred to as an occurrence upper limit value of the class 0) which is larger than the occurrence probability value of the class 0 and requires no calculation of an exponential function.

$$\sum_n K_{0,n} \exp(-z_{0,n}) \qquad \text{[Formula 30]}$$

Besides, without actually calculating the exponential function of the following formula 31 indicating the probability leading to the class 1 (hereunder, is referred to as an occurrence probability of the class 1), the identifying unit 5 carries out a given identifying process to calculate a lower limit value (hereunder, is referred to as an occurrence lower limit value of the class 1) which is smaller than the occurrence probability value of the class 1 and requires no calculation of an exponential function and an upper limit value (hereunder, is referred to as an occurrence upper limit value of the class 1) which is larger than the occurrence probability of the class 0 and requires no calculation of an exponential function.

$$\sum_n K_{1,n} \exp(-z_{1,n}) \qquad \text{[Formula 31]}$$

where $K_{k,n}$ denotes a positive integer and $z_{k,n}$ denotes a positive variable.

Then, by comparing the occurrence upper limit value of the class 0 and the occurrence lower limit value of the class 1 or comparing the occurrence upper limit value of the class 1 and the occurrence lower limit value of the class 0, the identifying unit 5 judges which is larger, the occurrence probability value of the class 0 or the occurrence probability value of the class 1.

As a result, when the occurrence probability value of the class 0 is definitely larger than the occurrence probability value of the class 1, the observed data D1 is identified to be the class 0. Conversely, when the occurrence probability value of the class 1 is definitely larger than the occurrence probability value of the class 0, the observed data D1 is identified to be the class 1.

In this manner, the identifying unit 5 can perform the comparison between the occurrence probability of the class 0 and the occurrence probability of the class 1 by using the occurrence upper limit value of the class 0, the occurrence lower limit value of the class 0, the occurrence upper limit value of the class 1, and the occurrence lower limit value of the class 1, which can be all simply calculated without performing the complicated arithmetic processing of an exponential function. Hence, by simply performing interval calculation, it can be identified whether the observed data are the class 0 or the class 1.

Besides, when it is unclear which is larger, the occurrence probability value of the class 0 or the occurrence probability value of the class 1, the identifying unit 5 narrows the numerical values among the occurrence upper limit value of the class 0, the occurrence lower limit value of the class 0, the occurrence upper limit value of the class 1, and the occurrence lower limit value of the class 1 in a stepwise fashion to continue to refine the comparison accuracy until the magnitude relation becomes clear between the occurrence probability of the class 0 and the occurrence probability of the class 1. Therefore, it can be identified which one of the class 0 and the class 1 the observe data D1 is, by performing the simple interval calculation without calculating an exponential function.

(2) Circuitry of the Identifying Unit (2-1) Fundamental Identifying Process

Now, the identifying unit 5 carries out a fundamental identifying process and a refining process. First, among these identifying processes, the fundamental identifying process is described below by using FIG. 3 and FIG. 4.

Figure 3:
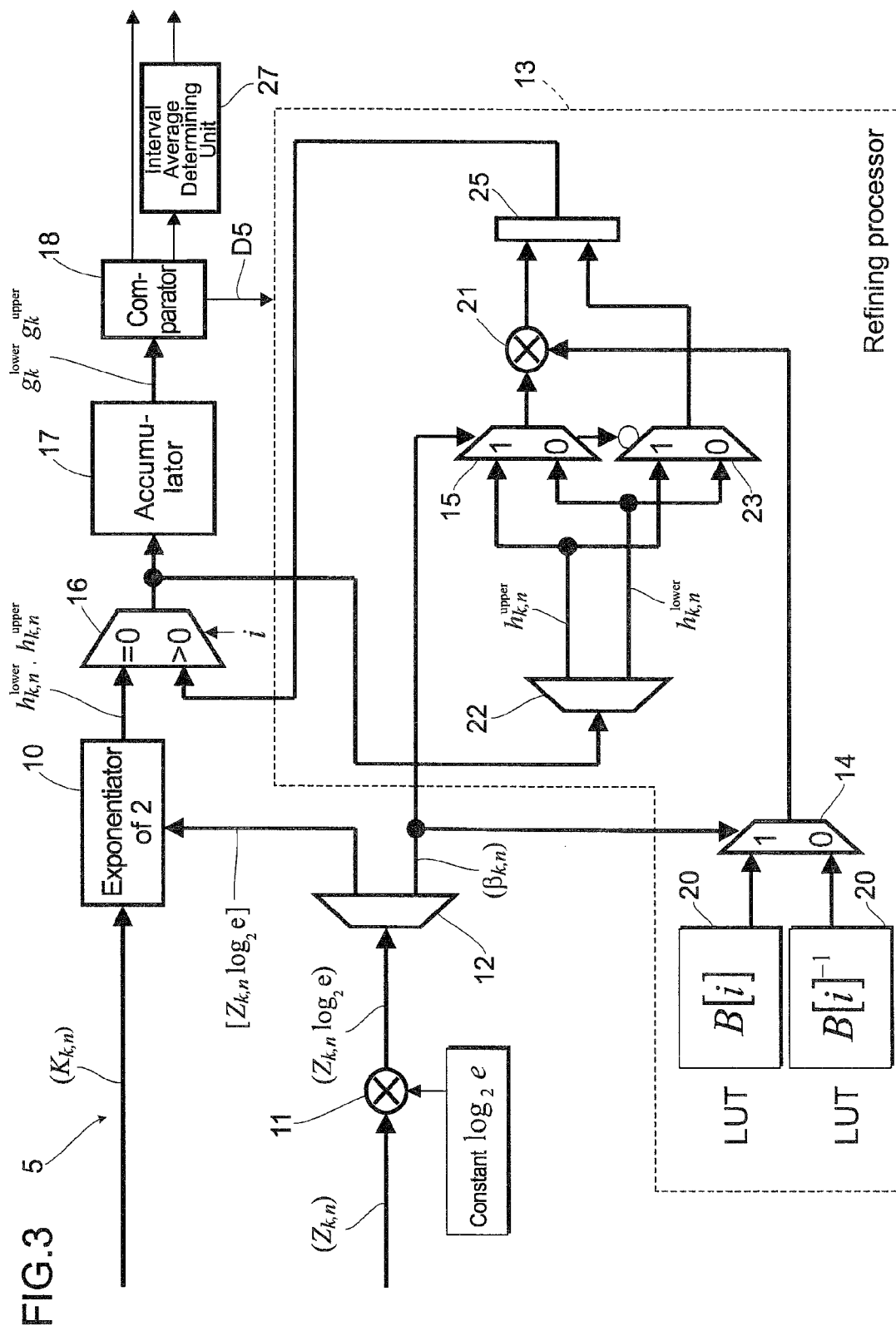
FIG. 3 is a block diagram illustrating a circuitry of an identifying unit.
Figure 4:
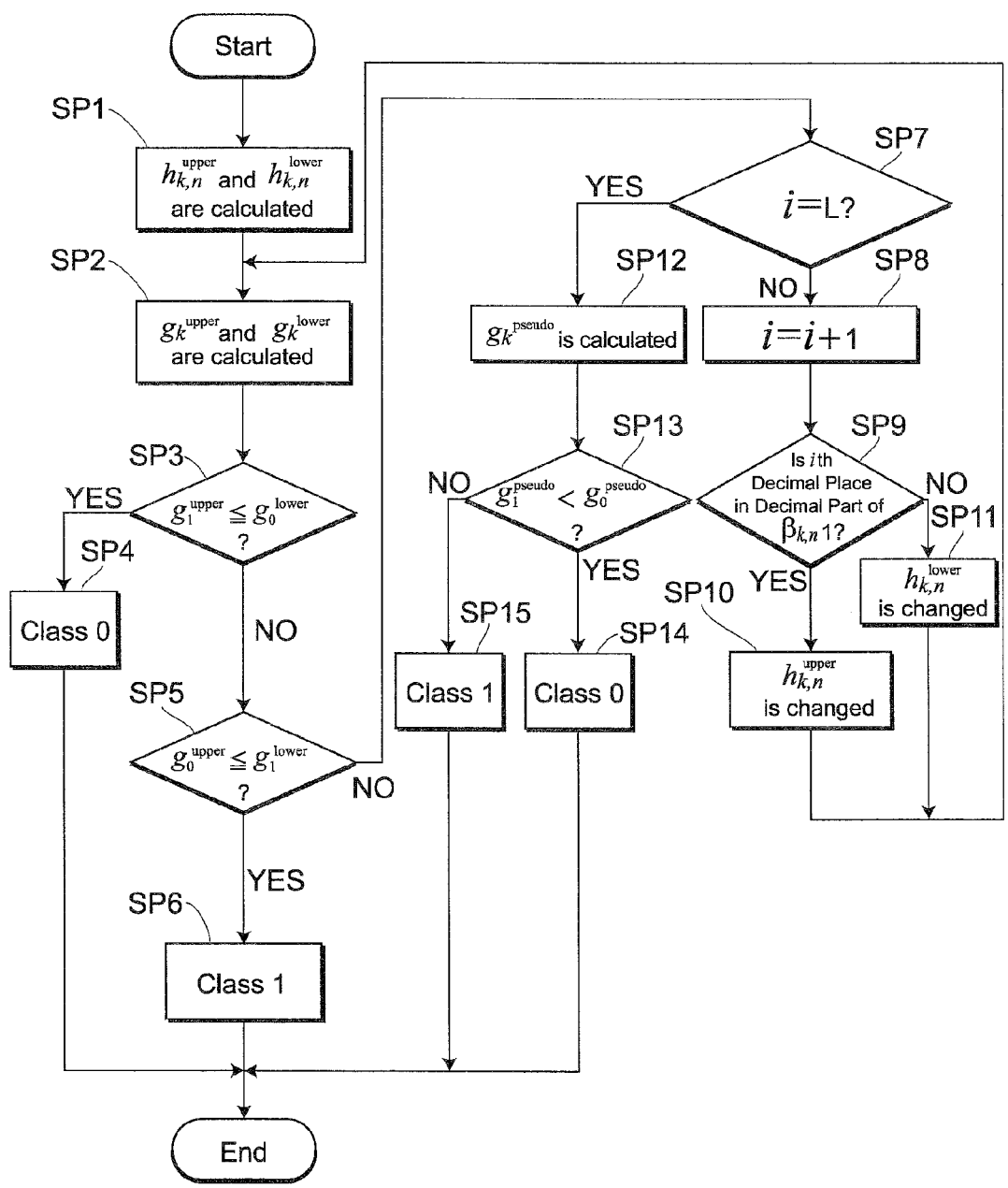
FIG. 4 is a flow chart illustrating an identification processing procedure.

FIG. 3 shows a circuitry of the identifying unit 5 for carrying out the identifying processes and FIG. 4 is a flow chart showing an identifying process procedure. The identifying unit 5 sends out the group ($K_{k,n}$) of constants from the weighting factor calculating unit 4 to a power of two multiplier 10. In this embodiment, k is defined as 0 indicating the class 0, or as 1 indicating the class 1, and n is defined as n=1 . . . , $N_k$ (that is, n=1 . . . , $N_0$ when k=0 and n=1 . . . , $N_1$ when k=1). In addition, $N_0$ and $N_1$ are each the number of Gaussian mixture distributions).

Besides, in this embodiment, $\log_2 e$ employed in the course of the identifying process in the identifying unit 5 and the following formulae 32, 33 employed in the refining process described below in the section (2-2) have been calculated in advance and the calculated results have been recorded, so that a burden on a arithmetic processing has been reduced.

$B[i] = 2^{-2^{-i}}$ [Formula 32]

$B[i]^{-1} = 2^{2^{-i}}$ [Formula 33]

In addition, as the maximum value of i, an arbitrary numeral value has been set in advance and in this embodiment, i=0, 1, . . . , L.

Practically, this identifying unit 5 sends out the group ($z_{k,n}$) of variables from the quadratic-form calculating unit 3 to a multiplier 11 to multiply the group ($z_{k,n}$) of variables by a constant $\log_2 e$ and then sends out a plurality of the ($z_{k,n} \log_2 e$) obtained by this multiplication to splitter 12.

The splitter 12 splits each ($z_{k,n} \log_2 e$) into integer parts and fraction parts to send out these integer parts to the power of two multiplier unit as a group ($[z_{k,n} \log_2 e]$) of the integer parts. In addition, the splitter 12 sends out the fraction parts obtained from the following formula 34 to a B[i] selector 14 of the refining processor 13 and first selector 15 thereof as a group ($\beta_{k,n}$) of the fraction parts in order to use the group ($\beta_{k,n}$) in performing the refining process described below. Additionally, the symbol [ ] in the group of the integer parts described above indicates an integer part.

$\beta_{k,n} = z_{k,n} \log_2 e - [z_{k,n} \log_2 e]$ [Formula 34]

The power of two multiplier 10 uses the group ($K_{k,n}$) of constants and the group ($[z_{k,n} \log_2 e]$) of integer parts to calculate $h_{0,n}^{upper}$ and $h_{0,n}^{lower}$ from the following formulae 35, 36 for all the numbers of n=1 . . . , $N_0$ when k=0 (step SP1) and then sends out a plurality of the $h_{0,n}^{upper}$ and the $h_{0,n}^{lower}$, which have been calculated for each of n, that is, 1 to $N_0$, to the accumulator 17 via selector 16.

$h_{k,n}^{upper} = K_{k,n} 2^{-[z_{k,n} \log_2 e]}$ [Formula 35]

$h_{k,n}^{lower} = h_{k,n}^{upper} 2^{-1}$ [Formula 36]

Similarly, the power of two multiplier 10 uses the group ($K_{k,n}$) of constants and the group ($[z_{k,n} \log_2 e]$) of integer parts to calculate $h_{1,n}^{upper}$ and $h_{1,n}^{lower}$ from the above formulae 35, 36 for all the numbers of n=1 . . . , $N_0$ when k=1 (step SP1) and then sends out a plurality of the $h_{1,n}^{upper}$ and $h_{1,n}^{lower}$, which have been calculated for each of n, that is, 1 to $N_0$, to the accumulator 17 via a selector 16.

The accumulator 17 defines k as 0 and continues to accumulate a plurality of the $h_{k,n}^{upper}$ calculated by using the following formula 37 with n sequentially changed from 1, 2 . . . up to N and as a result, works out $g_0^{upper}$ acting as the occurrence upper limit value of the class 0 (step SP2) to thereby send out the resultant $g_0^{upper}$ to the comparator 18.

$$g_k^{upper} = \sum_{n=1}^{N_k} h_{k,n}^{upper}$$ [Formula 37]

Also, the accumulator 17 defines k as 0 and continues to accumulate a plurality of $h_{k,n}^{lower}$ calculated by using the following formula 38 with n sequentially changed from 1 . . . to N and as a result, works out $g_0^{lower}$ acting as the occurrence lower limit value of the class 0 (step SP2) to thereby send out the resultant $g_0^{lower}$ to the comparator 18.

$$g_k^{lower} = \sum_{n=1}^{N_k} h_{k,n}^{lower}$$ [Formula 38]

Similarly, the accumulator 17 defines k as 1 and continues to accumulate a plurality of $h_{k,n}^{upper}$ calculated by using the above formula 37 with n sequentially changed from 1 . . . to N and as a result, works out $g_1^{upper}$ acting as the occurrence upper limit value of the class 1 (step SP2) to send out the $g_1^{upper}$ to the comparator 18. Also, the accumulator 17 defines k as 1 and continues to accumulate a plurality of $h_{k,n}^{lower}$ calculated by using the above formula 38 with n sequentially changed from 1 . . . to N and as a result, works out $g_1^{lower}$ acting as the occurrence lower limit value of the class 1 (step SP2) to send out the $g_1^{lower}$ to the comparator 18.

Figure 5A:
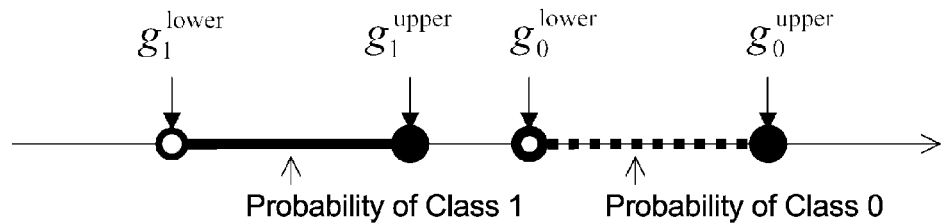
FIG. 5 is a schematic view illustrating a case where the magnitudes of $g_k^{upper}$ and $g_k^{lower}$ are clear.

The comparator 18 compares the $g_1^{upper}$ and the $g_0^{lower}$ to judge whether or not $g_1^{upper} \leq g_0^{lower}$ is satisfied evidently from the numerical values of the $g_1^{upper}$ and $g_0^{lower}$ as shown in FIG. 5(A) (step SP3). When having judged that $g_1^{upper} \leq g_0^{lower}$ is satisfied which indicates that the occurrence provability value of the class 0 is obviously larger than the occurrence provability value of the class 1, the comparator 18 determines that the class 0 is applicable (step SP4) to send out the determination result to a display unit (not shown).

Conversely, when it is judged that $g_1^{upper} \leq g_0^{lower}$ is not satisfied evidently from the numerical values thereof, the comparator 18 compares $g_0^{upper}$ and $g_1^{lower}$ to judge whether or not $g_0^{upper} \leq g_1^{lower}$ is satisfied evidently from the numerical values thereof (step SP5). When having determined that the $g_0^{upper} \leq g_1^{lower}$ is satisfied which indicates that the occurrence provability value of the class 1 is obviously larger than the occurrence provability value of the class 0, the comparator 18 determines that the class 1 is applicable (step SP6) to send out the determination result to the display unit (not shown).

In this manner, the display unit displays the determination result received from the comparator 18 through an image display or the like to thereby permit the determination result to be notified to a user. As an application of the device to the identification of a flesh color, there can be produced an image in which a background image and a human image are each distinctively identified so as to be able to be notified to a user, in such a manner that a pixel of the flesh color (class 1) is, e.g., white-color coded, and a pixel of the non-flesh color (class 0) is black-color coded, based on the results determined as a flesh color (class 1) or a non-flesh color (class 0) for every pixel. In the meantime, as for pixels that need undergoing a hereinafter-described refining process, they are gray-color coded, and then a user can be notified that the refining process has been carried out or that the fundamental identifying process described above has not yet been carried out.

(2-2) Refining Process

Figure 6A:
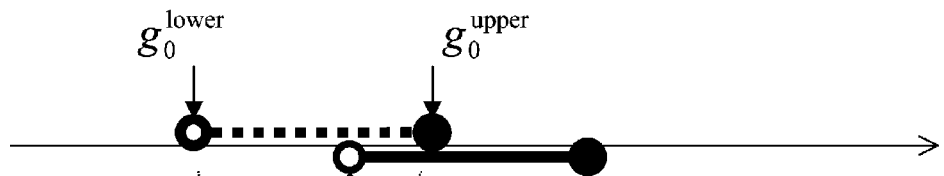
FIG. 6 is a schematic view illustrating $g_k^{upper}$ and $g_k^{lower}$ which have been subjected to a refining process when the magnitudes of $g_k^{upper}$ and $g_k^{lower}$ are unclear.
Figure 6B:
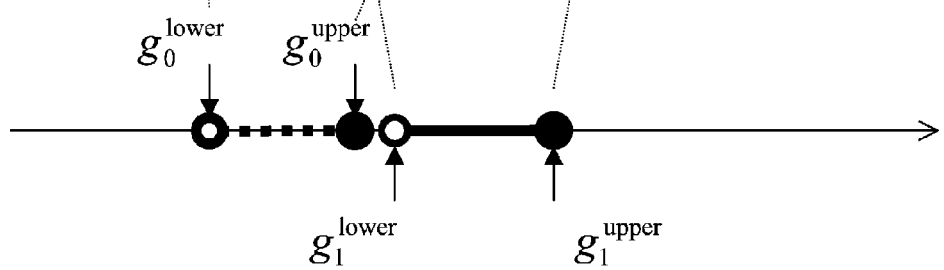

Here, the comparator 18 compares the numerical values of the $g_0^{upper}$ and $g_0^{lower}$ or the numerical values of the $g_0^{upper}$ and $g_1^{lower}$ by the fundamental identifying process described above. Then, when it has proved impossible to determine the magnitude relations between these numerical values, as shown in FIG. 6(A), the comparator 18 sends out a reprocessing signal indicating that the determination has proved to be impossible to the refining processor 13, thereby enabling the refining process to be carried out.

Here, the refining processor 13 is equipped with a storage unit 20 in which a lookup table (hereunder, abbreviated as LUT) that makes an association of the relations defined by the above-mentioned formulae 32, 33, is stored. Upon receiving the reprocessing signal D5 from the comparator 18, the refining processor 13 changes a value of i into a value of (i+1).

Here, practically, when it is unable to determine the magnitude relations between the $g_1^{upper}$ and the $g_0^{lower}$ and between the $g_0^{upper}$ and the $g_1^{lower}$ (that is, when a negative result has been obtained in step SP5), the arithmetic addition to increment the value of i one by one is carried out. Since the maximum value is preset at L, it is judged first whether or not i is L at this point (step SP7) and then, when i has not reached L yet, the value of is updated to be changed into the value of (i+1) (step SP8).

Here, as for the group $(\beta_{k,n})$ of fraction parts calculated in the splitter 12 by the above-described formula 34, individual processes of the respective fraction parts are varied from one to another, depending on whether the value at the ith decimal place in each fraction part making up the group $(\beta_{k,n})$ of fraction parts is 1 or 0. The $g_k^{upper}$ and the $g_k^{lower}$ can be calculated in the accumulator 17, using each of the $h_{k,n}^{lower}$ and $h_{k,n}^{upper}$ which have been updated by performing these different processes.

Hereunder, a process relative to a fraction part of which the value at the ith decimal place is 1 (hereunder, simply referred to as a 1 fraction part) and a process relative to a fraction part of which the value at the ith decimal place is 0 (hereunder, simply referred to as a 0 fraction part) are separately described.

(2-2-1) When the Value at the ith Decimal Place is 1.

Here, the B[i] selector 14 of the refining processor 13 judges, individually for each fraction part in the group of $(\beta_{k,n})$ of fraction parts, whether the value at the ith decimal place in each of fraction parts calculated by the above formula 34 in the splitter 12 is 1 or not (step SP9). When it is judged that the 1 fraction part exists among the group of $(\beta_{k,n})$ of fraction parts, the B[i] selector 14 reads B[i] out of the storage unit 20 to send out the B[i] to the multiplier 21 in processing the 1 fraction part.

At this time, an upper and lower limit values splitter 22 in the refining processor 13 receives, from the selector 16, the corresponding $h_{k,n}^{lower}$ calculated from an integer part of a variable from which this 1 fraction part has been determined (hereunder, referred to as a $h_{k,n}^{lower}$ corresponding to 1) and the corresponding $h_{k,n}^{upper}$ similarly calculated from the integer part of the variable from which this 1 fraction part has been determined (hereunder, referred to as a $h_{k,n}^{upper}$ corresponding to 1).

The upper and lower limit values splitter 22 splits these $h_{k,n}^{lower}$ corresponding to 1 and $h_{k,n}^{upper}$ corresponding to 1 to thereby send out the $h_{k,n}^{upper}$ corresponding to 1 to a first selector 15 and a second selector 23, while also sending out the $h_{k,n}^{lower}$ corresponding to 1 to the first selector 15 and the second selector 23.

Then, the first selector 15 recognizes that the fraction part currently being processed is the 1 fraction part based on the group $(\beta_{k,n})$ of fraction parts received from the splitter 12 and then selects the $h_{k,n}^{upper}$ corresponding to 1 to send out the same to the multiplier 21 and at the same time discard the $h_{k,n}^{lower}$ corresponding to 1.

Further, at this time, the first selector 15 sends out a selection signal to the second selector 23 so as to select the $h_{k,n}^{lower}$ corresponding to 1. As a result, the second selector 23 selects the $h_{k,n}^{lower}$ corresponding to 1 to send out the same to an updated value producing unit 25 and at the same time discard the $h_{k,n}^{upper}$ corresponding to 1.

The multiplier 21 multiplies the $h_{k,n}^{upper}$ corresponding to 1 by the B[i] to update only the $h_{k,n}^{upper}$ corresponding to 1 (step SP10) and then sends out the $h_{k,n}^{upper}$ B[i] corresponding to 1 (hereunder, referred to as an updated $h_{k,n}^{upper}$) to the updated value producing unit 25.

Upon receiving the updated $h_{k,n}^{upper}$, the updated value producing unit 25 pairs the updated $h_{k,n}^{upper}$ with the $h_{k,n}^{lower}$ corresponding to 1 to thereby send out the pair to the accumulator 17 via the selector 16.

(2-2-2) When the Value at the ith Decimal Place is 0

Conversely, when it is judged that the 0 fraction part exists among the group $(\beta_{k,n})$ of fraction parts, the B[i] selector 14 sends out $B[1]^{-1}$ to the multiplier 21 in processing the 0 fraction part.

At this time, the upper and lower limit values splitter 22 in the refining processor 13 receives, from the selector 16, the corresponding $h_{k,n}^{lower}$ calculated from an integer part of a variable from which this 0 fraction part has been determined (hereunder, referred to as a $h_{k,n}^{lower}$ corresponding to 0) and the corresponding $h_{k,n}^{upper}$ calculated from the integer part of the variable from which this 0 fraction part has been determined (hereunder, referred to as a $h_{k,n}^{upper}$ corresponding to 0).

The upper and lower limit values splitter 22 splits these $h_{k,n}^{lower}$ corresponding to 0 and $h_{k,n}^{upper}$ corresponding to 0 to thereby send out the $h_{k,n}^{lower}$ corresponding to 0 to the first selector 15 and the second selector 23 and also send out the $h_{k,n}^{upper}$ corresponding to 0 to the first selector 15 and the second selector 23.

Then, the first selector 15 recognizes that the fraction part being currently processed is the 0 fraction part based on the group ($\beta_{k,n}$) of fraction parts received from the upper and lower limit values splitter 22 and then selects the $h_{k,n}^{lower}$ corresponding to 0 to thereby send out the same to the multiplier 21 and at the same time discard the $h_{k,n}^{upper}$ corresponding to 0.

Further, at this time, the first selector 15 sends out a selection signal to the second selector 23 so as to select the $h_{k,n}^{upper}$ corresponding to 0. As a result, the second selector 23 selects the $h_{k,n}^{upper}$ corresponding to 0 to send out the same to the updated value producing unit 25 and discard the $h_{k,n}^{lower}$ corresponding to 0.

The multiplier 21 multiplies the $h_{k,n}^{lower}$ corresponding to 0 by $B[i]^{-1}$ to update only the $h_{k,n}^{lower}$ (step SP11) and then sends out the resultant $h_{k,n}^{lower} B[1]^{-1}$ corresponding to 0 (hereunder, referred to as an updated $h_{k,n}^{lower}$) to the updated value producing unit 25.

Upon receiving the updated $h_{k,n}^{lower}$, the updated value producing unit 25 pairs the updated $h_{k,n}^{lower}$ with the $h_{k,n}^{upper}$ corresponding to 0 to send out the pair to the accumulator 17 via the selector 16.

(2-2-3) Accumulation Converting Process

The accumulator 17 carries out accumulative calculation, inclusive of both the updated $h_{k,n}^{upper}$ and $h_{k,n}^{upper}$ corresponding to 0 according to the above formula 37 to thereby calculate again $g_k^{upper}$ (step SP2) and then send out the updated $g_k^{upper}$ to the comparator 18.

Besides, the accumulator 17 carries out accumulative calculation, inclusive of the updated $h_{k,n}^{lower}$ and $h_{k,n}^{lower}$ corresponding to 1 according to the above formula 38 to thereby calculate again $g_k^{lower}$ (step SP2), and then send out the updated $g_k^{lower}$ to the comparator 18.

The comparator 18 compares the updated $g_k^{upper}$ and the updated $g_k^{lower}$ with each other to judge whether or not $g_1^{upper} \leq g_0^{lower}$ is evidently satisfied from the numerical values thereof (step SP3). Then, the comparator 18 determines that the class 0 is applicable when $g_1^{upper} \leq g_0^{lower}$ can be determined to be satisfied by narrowing an interval between the numerical values of the $g_k^{upper}$ and $g_k^{lower}$ (step SP4) and then sends out the determination result to the display unit.

Figure 5B:
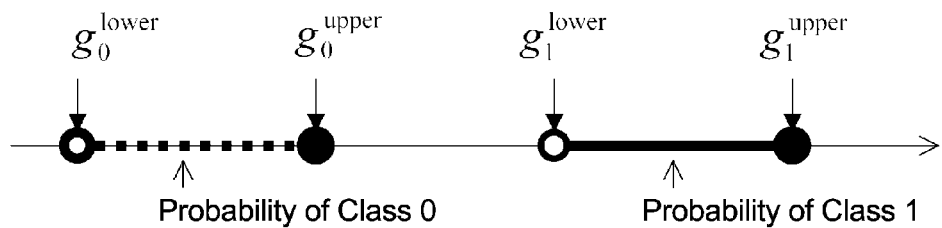

Contrarily, when it is judged that $g_1^{upper} \leq g_0^{lower}$ is evidently not satisfied from the numerical values thereof, the comparator 18 compares the $g_0^{upper}$ and the $g_1^{lower}$ to judge whether or not $g_0^{upper} \leq g_1^{lower}$ is satisfied evidently from the numerical values thereof (step SP5). As shown in FIG. 5(B), the comparator determines that the class 1 is applicable when $g_0^{upper} \leq g_1^{lower}$ can be determined to be satisfied by narrowing an interval between the numerical values of the $g_0^{upper}$ and $g_1^{lower}$ (step SP6) and then sends out the determination result to the display unit.

Then, when the comparison of the numerical values of the $g_1^{upper}$ and $g_0^{lower}$ with each other or of the numerical values of $g_0^{upper}$ and $g_1^{lower}$ with each other has proved it is impossible to determine the magnitude relations between these numerical values, then the refining processor 13 changes the value of i into a value of (i+1) and reexecutes the refining process and then repeats the processes described above.

In this manner, the refining processor 13 continues to update a value of i to be changed into a value of (i+1) until the magnitude relations between the numerical values of the $g_1^{upper}$ and $g_0^{lower}$ and between the numerical values of the $g_0^{upper}$ and $g_1^{lower}$ can be determined, and repeats this process until the value of i reaches its maximum value L.

Here, when the magnitude relations between the numerical values of the $g_1^{upper}$ and $g_0^{lower}$ and between the numerical values of the $g_0^{upper}$ and $g_1^{lower}$ have proved to be unable to be determined even after the above process is repeated by continuing to update the value of i into a value of (i+1) until the value of i reaches the maximum value L, then the refining processor 13 carries out a hereinafter-described interval averaging process by an interval average determining unit 27, thus making it possible to finally determine which of the classes 0 and 1 is applicable.

Practically, the interval average determining unit 27 calculates $g_0^{pseudo}$ that is an interval average after the updating when k=0 as well as $g_1^{pseudo}$ is an interval average after the updating when k=1, using the following formula 39 (step SP12):

$$g_k^{pseudo} = 2^{-1}\{g_k^{lower} B[L]^{-1} + g_k^{upper}\}$$ [Formula 39]

Then, when having judged the magnitude relation between the $g_1^{pseudo}$ and the $g_0^{pseudo}$ (step SP13) to determine it to be $g_1^{pseudo} < g_0^{pseudo}$, the interval average determining unit 27 determines that the class 0 is applicable (step SP14). On the other hand, when it is judged that the magnitude relation of $g_1^{pseudo} < g_0^{pseudo}$ is not satisfied, the interval average determining unit 27 determines that the class 1 is applicable to the observed data D1 (step SP15). In this way, the interval average determining unit 27 determines which of the classes 0 and 1 is applicable to the observed data D1 to thereby send out the determination result to the display unit, thus permitting the determination result to be notified to a user.

(3) Operation and Effects

In the scheme described above, the identification device 1 is allowed to carry out the multiplication process multiplying the group ($z_{k,n}$) of variables by the constant $\log_2 e$, the power of two multiplication process to calculate a plurality of the $h_{k,n}^{upper}$ and $h_{k,n}^{lower}$ by changing n sequentially from 1 to $N_k$ and the accumulation process accumulating each of a plurality of the $h_{k,n}^{upper}$ and $h_{k,n}^{lower}$ to obtain the $g_k^{upper}$ and the $g_k^{lower}$.

Accordingly, the identification device 1 can judge the magnitude relation between the occurrence probability value of the class 0 and that of the class 1 from the magnitude relation between the $g_k^{upper}$ and the $g_k^{lower}$ expressed by the integer power of binary numbers sandwiching a true number, without the need of carrying out the conventional accurate arithmetic processing of an exponential function, thereby enabling the identifying of which of the classes 0 and 1 is applicable to the observed data D1 by a simple interval calculation, thus making it possible to avoid the complicated and heavy-loading arithmetic processing of an exponential function relative to the occurrence probability values of the classes 0 and 1 and therefore, a burden on the arithmetic processing can be significantly reduced.

Besides, according to the identification device 1, due to the reduction of costs incurred in calculating an exponential function, the identification device 1 can rapidly carry out the determination of which one of the classes 0 and 1 is applicable to the observed data D1.

In addition to this, even when the magnitude relation between the $g_k^{upper}$ and the $g_k^{lower}$ is unclear, the identification device 1 is allowed to carry out a process of multiplying B[i] corresponding to a bit pattern of the group ($\beta_{k,n}$) of the fraction parts by $h_{k,n}^{upper}$, or of multiplying $B[i]^{-1}$ by $h_{k,n}^{lower}$ and then is allowed to carry out the arithmetic processing of the $g_k^{upper}$ and $g_k^{lower}$, using the updated $h_{k,n}^{upper}$ and the updated $h_{k,n}^{lower}$.

As a result, the identification device 1 improves the accuracy of the comparative calculation in a stepwise fashion to narrow an unclear interval and thus can identify which one of the classes 0 and 1 is applicable to the observed data D1, thus making it possible to avoid the arithmetic processing of a complicated exponential function which expresses the occurrence probability values of the classes 0 and 1 and therefore imposes a heavy burden on an identification device.

Further, when the magnitude relation between the numerical values between the $g_k^{upper}$ and the $g_k^{lower}$ is still unclear even if the refining process is repeated until the value of i reaches the maximum value L, the $g_0^{pseudo}$ and the $g_1^{pseudo}$ that are each an interval average are calculated to determine the magnitude relation in a pseudo manner from the magnitude relation therebetween. Hence, even if the magnitude relation between the numerical values of the $g_k^{upper}$ and $g_k^{lower}$ is unclear even by employing the refining process described above, the identification device 1 can finally determine with certainty which one of the classes 0 and 1 is applicable to the observed data D1.

(4) Examples

An example is shown in which the identification device 1 according to the present invention is applied to identify a flesh color of an image. In this example, in order to identify a flesh color in an image taken of a person as shown in FIG. 7(A), just the above fundamental identifying process was carried out. As a result, when two Gaussian distributions were mixed, an identification result shown in FIG. 7(B) was obtained. When three Gaussian distributions were mixed, an identification result shown in FIG. 7(C) was obtained, while when four Gaussian distributions were mixed, an identification result shown in FIG. 7(D) was obtained.

Figure 7D:
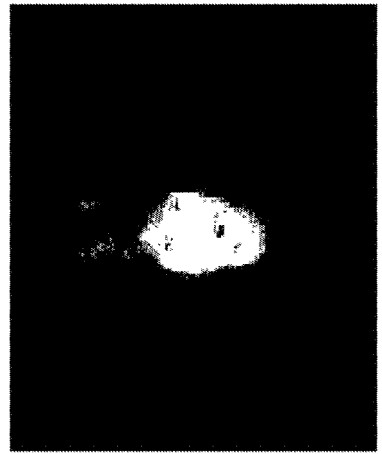
FIG. 7 is pictures illustrating images acting as observed data and an identified result obtained by identifying a flesh color in the images.
Figure 7A:
Figure 7C:
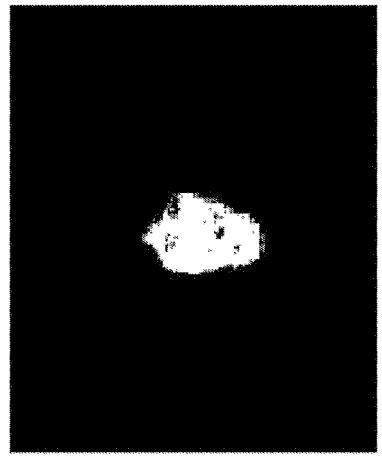
Figure 7B:
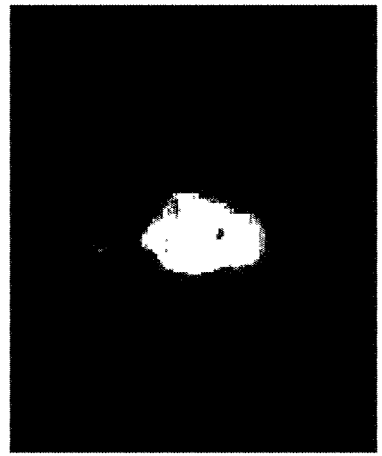

Here, in FIGS. 7(B), 7(C) and 7(D), a white color indicates a flesh color and a black color indicates a non-flesh color and further a gray color indicates an undetermined region.

A ratio at which the determination was completed just by the fundamental identifying process was 99.692% when two Gaussian distributions were mixed, 99.617% when three Gaussian distributions were mixed, and 99.613% when four Gaussian distributions were mixed. Thus, in any cases, no calculation by an exponential function was needed in the regions of 99% or more.

Further, in this example, it could be verified that the percentage of the observed data whose identifying process was required to progress to the refining process was less than 1%. In addition, a repeat count required to complete 100% of the determination in the double-precision calculation was 7 when two Gaussian distributions were mixed, 10 when three Gaussian distributions were mixed and 8 when four Gaussian distributions were mixed.

In the meantime, the present invention is not limited to the foregoing embodiment and various modifications are possible within the scope of the gist of the invention. In the step SP3 and the step SP5, for example, it may be judged first whether or not $g_0^{upper} \leq g_1^{lower}$ is satisfied (step SP5) and then judged whether or not $g_1^{upper} \leq g_0^{lower}$ is satisfied (step SP3).

Besides, the identification device 1 according to the present invention is applicable to a wide range of devices which require a function to automatically identify an object based on observed data obtained by sensors, such as medical and healthcare devices, disaster prevention and monitor devices, automobiles and industrial apparatuses and instruments.

Specifically, the identification device 1 according to the present invention is expected to be used for a wireless sensor network (WSN) making up networks with a small-sized device called a sensor node scattered therewith, said sensor node being mounted with a sensor, a signal processing function, a pattern recognition function, a wireless communication function and batteries (or an independent generator).

The invention claimed is:

1. An identification device for classifying observed data based on parameters of Gaussian mixture distributions on the assumption that a distribution of said observed data follows Gaussian mixture distributions, said identification device comprising:

a power of two multiplier for calculating the following formulae:

$$h_{k,n}^{upper} = K_{k,n} 2^{-[z_{k,n} \log_2 e]} \quad \text{[Formula 40]}$$

(where $[z_{k,n} \log_2 e]$ denotes an integer part of $z_{k,n} \log_2 e$)

$$h_{k,n}^{lower} = h_{k,n}^{upper} 2^{-1} \quad \text{[Formula 41]}$$

using a group $z_{k,n}$ of variables obtained based on respective feature vectors of a plurality of said observed data (k denotes 1 or 0 indicating a class, and n denotes a distribution number of a Gaussian distribution assumed in each class) and a group $K_{k,n}$ of constants obtained based on said parameter of Gaussian mixture distributions;

an accumulator for calculating the following formulae 42, 43

$$g_k^{upper} = \sum_{n=1}^{N_k} h_{k,n}^{upper} \quad \text{[Formula 42]}$$

$$g_k^{lower} = \sum_{n=1}^{N_k} h_{k,n}^{lower} \quad \text{[Formula 43]}$$

($N_k$ denotes the number of Gaussian mixture distributions of a class k) using said $h_{k,n}^{upper}$ and said $h_{k,n}^{lower}$; and a comparator for comparing said $g_k^{upper}$ and said $g_k^{lower}$ to classify said observed data, using $g_1^{upper} \leq g_0^{lower}$ and $g_0^{upper} \leq g_1^{lower}$.

2. The identification device according to claim 1, wherein said identification device is equipped with a storage unit in which the following formulae are stored, $$B[i] = 2^{<2^{-i}}} \quad \text{[Formula 44]}$$

$$B[i]^{-1} = 2^{<2^{-i}}} \quad \text{[Formula 45]}$$

(where i=0, 1 . . . , L, wherein L is a positive integer that is arbitrarily set)

and when said $g_k^{upper}$ and said $g_k^{lower}$ are compared to each other to prove impossible to determine the magnitude relation between said $g_k^{upper}$ and said $g_k^{lower}$, said value of i is changed into a value of (i+1) and then it is judged whether a value at the ith decimal place in a fraction part of $z_{k,n} \log_2 e$ is 1 or 0, and when the value at the ith decimal place is proved to be 1 as a result, said $h_{k,n}^{upper}$ is multiplied by said B[1] in said formula 44 and thus said $h_{k,n}^{upper}$ is updated to thereby calculate said $g_k^{upper}$, whereas when the value at the ith decimal place is proved to be 0, said $h_{k,n}^{lower}$ is multiplied by said $B[1]^{-1}$ in said formula 45 and thus said $h_{k,n}^{lower}$ is updated to thereby calculate said $g_k^{lower}$.

3. The identification device according to claim 2, wherein said identification device is equipped with an averaging processor which calculates the following formula:

$$g_k^{pseudo} = 2^{-1} \{g_k^{lower} B[L]^{-1} + g_k^{upper}\} \quad \text{[Formula 46]}$$

when said value of i is said L to thereby classify said observed data by using $g_1^{pseudo} < g_0^{pseudo}$ and $g_0^{pseudo} < g_1^{pseudo}$.

4. An identification method for classifying observed data based on parameters of Gaussian mixture distributions on the assumption that a distribution of said observed data follows Gaussian mixture distributions, said identification method comprising steps of:

performing power of two multiplication for calculating the following formulae:

$$h_{k,n}^{upper} = K_{k,n} 2^{-[z_{k,n} \log_2 e]}$$ [Formula 47]

(where $[z_{k,n} \log_2 e]$ denotes an integer part of $z_{k,n} \log_2 e$)

$$h_{k,n}^{lower} = h_{k,n}^{upper} 2^{-1}$$ [Formula 47]

using a group $z_{k,n}$ of variables obtained based on respective feature vectors of a plurality of said observed data (k denotes 1 or 0 indicating a class, and n denotes a distribution number of a Gaussian distribution assumed in each class) and a group $K_{k,n}$ of constants obtained based on said parameter of Gaussian mixture distributions;

performing accumulation for calculating the following formulae:

$$g_k^{upper} = \sum_{n=1}^{N_k} h_{k,n}^{upper}$$ [Formula 49]

$$g_k^{lower} = \sum_{n=1}^{N_k} h_{k,n}^{lower}$$ [Formula 50]

(where $N_k$ denotes the number of Gaussian mixture distributions of a class k) using said $h_{k,n}^{upper}$ and said $h_{k,n}^{lower}$, which have been calculated in said step of performing power of two multiplication; and comparing said $g_k^{upper}$ and said $g_k^{lower}$, which have been calculated in said step of performing accumulation to classify said observed data, using $g_1^{upper} \leq g_0^{lower}$ and $g_0^{upper} \leq g_1^{lower}$.

5. The identification method according to claim 4, wherein said identification method comprises a step of a refining process in which when said $g_k^{upper}$ and said $g_k^{lower}$ are compared to each other to prove impossible to determine the magnitude relation between said $g_k^{upper}$ and said $g_k^{lower}$, a value of i (where i=0, 1 . . . , L, and L is a positive integer that is arbitrarily set) is changed into a value of (i+1) and then it is judged whether the ith decimal place in a fraction part of $z_{k,n} \log_2 e$ is 1 or 0 and as a result, when the ith decimal place of $z_{k,n} \log_2 e$ is proved to be 1, said $h_{k,n}^{upper}$ is multiplied by the following formula:

$$B[i] = 2^{-2^{-i}}$$ [Formula 51]

and thus said $h_{k,n}^{upper}$ is updated to thereby calculate said $g_k^{upper}$, whereas when the ith decimal place of $z_{k,n} \log_2 e$ is proved to be 0, said $h_{k,n}^{lower}$ is multiplied by the following formula $$B[i]^{-1} = 2^{2^{-i}}$$ [Formula 52]

and thus said $h_{k,n}^{lower}$ is updated to thus calculate said $g_k^{lower}$.

6. The identification method according to claim 5, wherein said identification method is equipped with a step of an averaging process in which when a value of said i is said L, the following formula:

$$g_k^{pseudo} = 2^{-1} \{g_k^{lower} B[L]^{-1} + g_k^{upper}\}$$ [Formula 53]

is calculated to classify said observed data by using $g_1^{pseudo} \leq g_0^{pseudo}$ and $g_0^{psuedo} \leq g_1^{pseudo}$.

7. An identification processing program stored on a non-transitory computer storage medium for classifying observed data based on parameters of Gaussian mixture distributions on the assumption that a distribution of said observed data follows Gaussian mixture distributions, said identification processing program allowing a computer to execute the steps of:

performing power of two multiplication for calculating the following formulae:

$$h_{k,n}^{upper} = K_{k,n} 2^{[-z_{k,n} \log_2 e]}$$ [Formula 54]

(where $[z_{k,n} \log_2 e]$ denotes an integer part of $Z_{k,n} \log_2 e$)

$$h_{k,n}^{lower} = h_{k,n}^{upper} 2^{-1}$$ [Formula 55]

by using a group $z_{k,n}$ of variables obtained based on respective feature vectors of a plurality of said observed data (k denotes 1 or 0 indicating a class, and n denotes a distribution number of a Gaussian distribution assumed in each class) and a group $K_{k,n}$ of constants obtained based on said parameter of Gaussian mixture distributions;

performing accumulation for calculating the following formulae:

$$g_k^{upper} = \sum_{n=1}^{N_k} h_{k,n}^{upper}$$ [Formula 56]

$$g_k^{lower} = \sum_{n=1}^{N_k} h_{k,n}^{lower}$$ [Formula 57]

($N_k$ denotes the number of Gaussian mixture distributions of a class k) by using said $h_{k,n}^{upper}$ and said $h_{k,n}^{lower}$, which have been calculated in said step of performing power of two multiplication; and comparing said $g_k^{upper}$ and said $g_k^{lower}$ to classify said observed data by using $g_1^{upper} \leq g_0^{lower} g_0^{upper} g_1^{lower}$.

8. The identification processing program according to claim 7, wherein said identification processing program comprises a step of a refining process in which when said $g_k^{upper}$ and said $g_k^{lower}$ are compared to each other to prove impossible to determine the magnitude relation between said $g_k^{upper}$ and said said $g_k^{lower}$, said value of i (i=0, 1 . . . , L, and L is a positive integer arbitrarily set) is changed into a value of (i+1) and then it is judged whether a value at the ith decimal place in a fraction part of $z_{k,n} \log_2 e$ is 1 or 0, and as a result, when the value at the ith decimal place of $z_{k,n} \log_2 e$ is proved to be 1, said $h_{k,n}^{upper}$ is multiplied by the following formula:

$$B[i] = 2^{-2^{-i}}$$ [Formula 58]

and thus said $h_{k,n}^{upper}$ is updated to thus calculate said $g_k^{upper}$, whereas when said value at the ith decimal place of $z_{k,n} \log_2 e$ is proved to be 0, said $h_{k,n}^{lower}$ is multiplied by the following formula:

$$B[i]^{-1} = 2^{2^{-i}}$$ [Formula 59]

and thus said $h_{k,n}^{lower}$ is updated to thus calculate said $g_k^{lower}$.

9. The identification processing program according to claim 8, wherein said identification processing program comprises a step of an averaging process in which when a value of said i is said L, the following formula:

$$g_k^{pseudo} = 2^{-1} \{g_k^{lower} B[L]^{-1} + g_k^{upper}\}$$ [Formula 60]

is calculated to classify said observed data by using $g_1^{pseudo} \leq g_0^{pseudo}$ and $g_0^{psuedo} \leq g_1^{pseudo}$.

* * * * *